United States Patent
Tavi et al.

(10) Patent No.: US 6,692,421 B2
(45) Date of Patent: Feb. 17, 2004

(54) END PACKING FOR A DEFLECTION COMPENSATED ROLL

(75) Inventors: Antti Tavi, Jyväskylä (FI); Ari Lehto, Leppävesi (FI); Kari Holopainen, Muurame (FI); Markku Arvonen, Jyväskylä (FI); Mika Lämsä, Karkkila (FI); Juhani Niskanen, Oulunsalo (FI); Jorma Snellman, Jyväskylä (FI); Jouni Pakkanen, Jyväskylä (FI); Jori Onnela, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/055,078

(22) Filed: Jan. 23, 2002

(65) Prior Publication Data

US 2002/0115542 A1 Aug. 22, 2002

(30) Foreign Application Priority Data

Jan. 29, 2001 (FI) .............................. 010043 U

(51) Int. Cl.[7] .............................................. B23P 15/00
(52) U.S. Cl. ................... 492/7; 492/2; 492/16; 492/20; 492/47
(58) Field of Search ........................... 492/2, 7, 16, 20, 492/47; 277/303, 308, 347, 348, 358, 387, 388, 412, 413; 162/358.3; 100/162 R, 163 R, 162 B

(56) References Cited

U.S. PATENT DOCUMENTS 4,363,490 A * 12/1982 Kuehn ........................ 277/420
4,399,747 A * 8/1983 Schiel et al. ............. 100/162 B
4,709,629 A * 12/1987 Appenzeller et al. ..... 100/162 B
4,944,089 A * 7/1990 Flamig et al. ............ 29/895.22
5,599,263 A * 2/1997 Haiko et al. .................. 492/7
6,443,459 B2 * 9/2002 Lebeau et al. .............. 277/372
6,443,880 B2 * 9/2002 Blais et al. .................. 492/16

* cited by examiner

Primary Examiner—I Cuda Rosenbaum
(74) Attorney, Agent, or Firm—Steinberg & Raskin, P.C.

(57) ABSTRACT

The present invention relates to an end packing (20, 40, 60, 70, 80) for a deflection compensated roll. The roll including a stationary shaft (1) and a roll shell (2), bearing-mounted rotatably therearound and having each end thereof provided with a shaft-enclosing annular end cap (3). The end cap (3) has its surface internal in the axial direction of the roll or its surface external in the axial direction formed with a sealing surface (10, 50, 61, 71, 81). The end packing elements (20, 40, 60, 70, 80) are provided with an annular packing member (12; 42; 62; 72; 82) extending around the shaft (2) and including a front face, which is directed towards said sealing surface (10, 50, 61, 71, 81) and which is in contact with the sealing surface (10, 50) or separated from the sealing surface (61, 71, 81) by a gap constituting an axially directed narrow slot. The packing member (12; 42; 62; 72; 82) is provided with elements connected to a supply of compressed air for delivering compressed air into a cavity (14, 44, 69, 92, 105) between the packing member and the sealing surface, whereby the compressed air striving to flow between the packing member's front face and the sealing surface into and out of the roll functions as a seal.

7 Claims, 7 Drawing Sheets

END PACKING FOR A DEFLECTION COMPENSATED ROLL

FIELD OF THE INVENTION

The present invention relates to an end packing for a deflection compensated roll, said roll comprising a stationary shaft and a roll shell, bearing-mounted rotatably therearound and having each end thereof provided with a shaft-enclosing annular end cap, having its surface internal in the axial direction of the roll or its surface external in the axial direction formed with a sealing surface, and shaft-mounted bearing elements in each axial end zone of the roll shell inside the end cap. In a second aspect, the invention relates also to an end packing for a deflection compensated roll, said roll comprising a stationary shaft and a roll shell bearing-mounted rotatably therearound and having each end thereof provided with a shaft-enclosing annular end cap, having an external surface and an internal surface in the axial direction of the roll, said internal surface being formed with a sealing surface, and shaft-mounted bearing elements in each axial end zone of the roll shell inside the end cap, the roll end packing elements being mounted on the shaft in a section between the end cap and the bearing elements for a sealing contact against the sealing surface of the end cap. In a third aspect, the invention relates also to an end packing for a deflection compensated roll, said roll comprising a stationary shaft and a roll shell bearing-mounted rotatably therearound and having each end thereof provided with a shaft-enclosing annular end cap, having its surface which is internal in the axial direction of the roll formed with a sealing surface, and shaft-mounted slide bearing elements in each axial end zone of the roll shell inside the end cap, said slide bearing elements comprising radial slide bearing elements and axial slide bearing elements.

BACKGROUND OF THE INVENTION

FIG. 1 shows one currently available packing system for sealing the end of a roll shell 2 mounted with bearings rotatably around a roll shaft 1. The bearing elements consist of a roller bearing 9. The roll shell has its axial ends provided with an end cap 3, including projections 6 and 7 extending outward in the axial direction of the roll, the inner projection 7 having its outer surface constitute a sealing surface for packing elements 8 which are mounted on a body member 4 secured to the shaft 1. The body member 4 is further provided with chute elements 5 for collecting the oil seeping through the packing. A problem in this system is that the packing may leak quite easily, i.e. it does not function properly as intended. U.S. Pat. No. 6,004,249 discloses an end packing assembly for a roll, comprising a roll shell mounted rotatably around a stationary shaft by means of slide bearings. This assembly includes first packing elements, comprising a spring-loaded packing member which is compressible against an internal end cap surface substantially perpendicular to the longitudinal axis of the roll shaft. In addition, this assembly includes second packing elements, comprising a chamber provided on a roll shaft or in an end cap, in which is fitted a radially movable ring-shaped packing plate provided with a sealing lip setting against a complementary surface. This is a comparatively complex assembly, which is difficult to implement in practice.

OBJECTS AND SUMMARY OF THE INVENTION

Thus, it is an object of the present invention to provide an improved end packing for a deflection compensated roll, said end packing being relatively simple in construction and reliable in operation. In order to accomplish this object, an end packing of the invention for a deflection compensated roll, said roll comprising a stationary shaft and a roll shell bearing-mounted rotatably therearound and having each end thereof provided with a shaft-enclosing annular end cap, having its surface internal in the axial direction of the roll or its surface external in the axial direction formed with a sealing surface, and shaft-mounted bearing elements in each axial end zone of the roll shell inside the end cap, is characterized in that the end packing elements are provided with an annular packing member extending around the shaft and comprising a front face, which is directed towards said sealing surface and which is in contact with the sealing surface or separated from the sealing surface by a gap constituting an axially directed narrow slot, said packing member being provided with elements connected to a supply of compressed air for delivering compressed air into a cavity between the packing member and the sealing surface, whereby the compressed air striving to flow between the packing member's front face and the sealing surface into and out of the roll functions as a seal.

According to the second aspect of the invention, the invention relates also to an end packing for a deflection compensated roll, said roll comprising a stationary shaft and a roll shell bearing-mounted rotatably therearound and having each end thereof provided with a shaft-enclosing annular end cap, having an internal surface in the axial direction of the roll formed with a sealing surface, and shaft-mounted bearing elements in each axial end zone of the roll shell inside the end cap, the roll end packing elements being mounted on the shaft inside the end cap for a sealing contact against the sealing surface of the end cap, said end packing being characterized in that the packing elements include a labyrinth ring mounted on the shaft, which comprises a packing member compressible against a sealing surface and provided with sealing lips setting against the sealing surface, between which is a cavity opening towards the sealing surface, and that the labyrinth ring is provided with a bore, whereby the cavity of the packing member can be supplied with compressed air from a compressed air duct present in the shaft.

According to the third aspect of the invention, the invention relates also to an end packing for a deflection compensated roll, said roll comprising a stationary shaft and a roll shell mounted with bearings rotatably therearound and having each end thereof provided with a shaft-enclosing annular end cap, having its surface which is internal in the axial direction of the roll formed with a sealing surface, and shaft-mounted slide bearing elements in the area of each axial end of the roll shell inside the end cap, said slide bearing elements comprising radial slide bearing elements and axial slide bearing elements, whereby the roll end packing elements are mounted in connection with the shaft inside the end cap for a sealing contact against the sealing surface of the end cap, said end packing for a slide-bearing fitted roll being characterized in that the packing elements include a sealing ring linked to the bearing shoes of the axial slide bearing elements and located in radial direction inside said bearing shoes, said sealing ring being provided with a cavity opening toward the end cap sealing surface and connected a supply of compressed air, said sealing ring being separated from the end cap sealing surface by an axial gap constituting a narrow slot, said slot allowing compressed air to flow inside the roll and out of the roll.

BRIEF DESCRIPTION OF THE DRAWINGS

The invention will now be described in more detail with reference to the accompanying drawings, in which:

FIG. 2A is an enlarged partial view, showing a detail of the packing elements of FIG. 2.

DETAILED DESCRIPTION OF THE INVENTION

Figure 1:
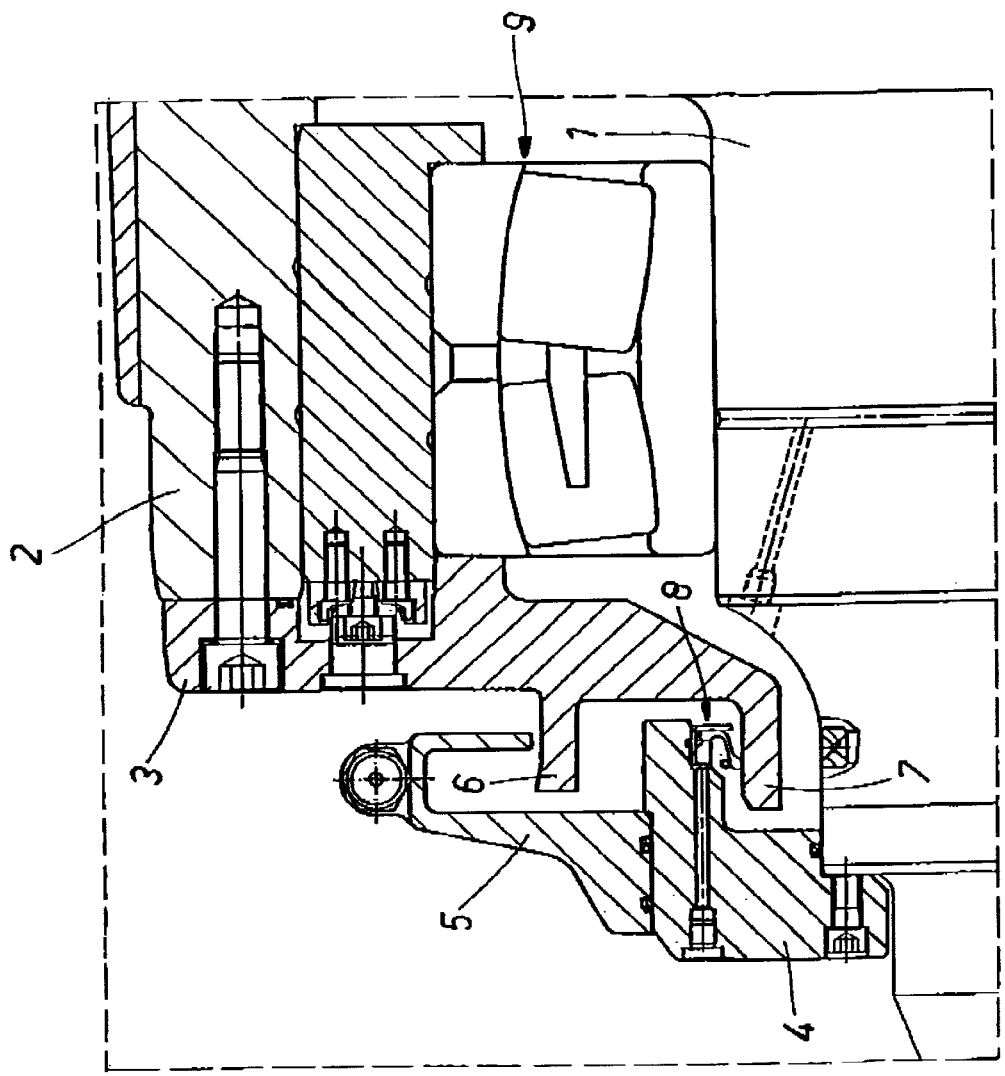
FIG. 1 is a schematic side elevation, showing an end packing assembly of the prior art described in the introduction.
Figure 2:
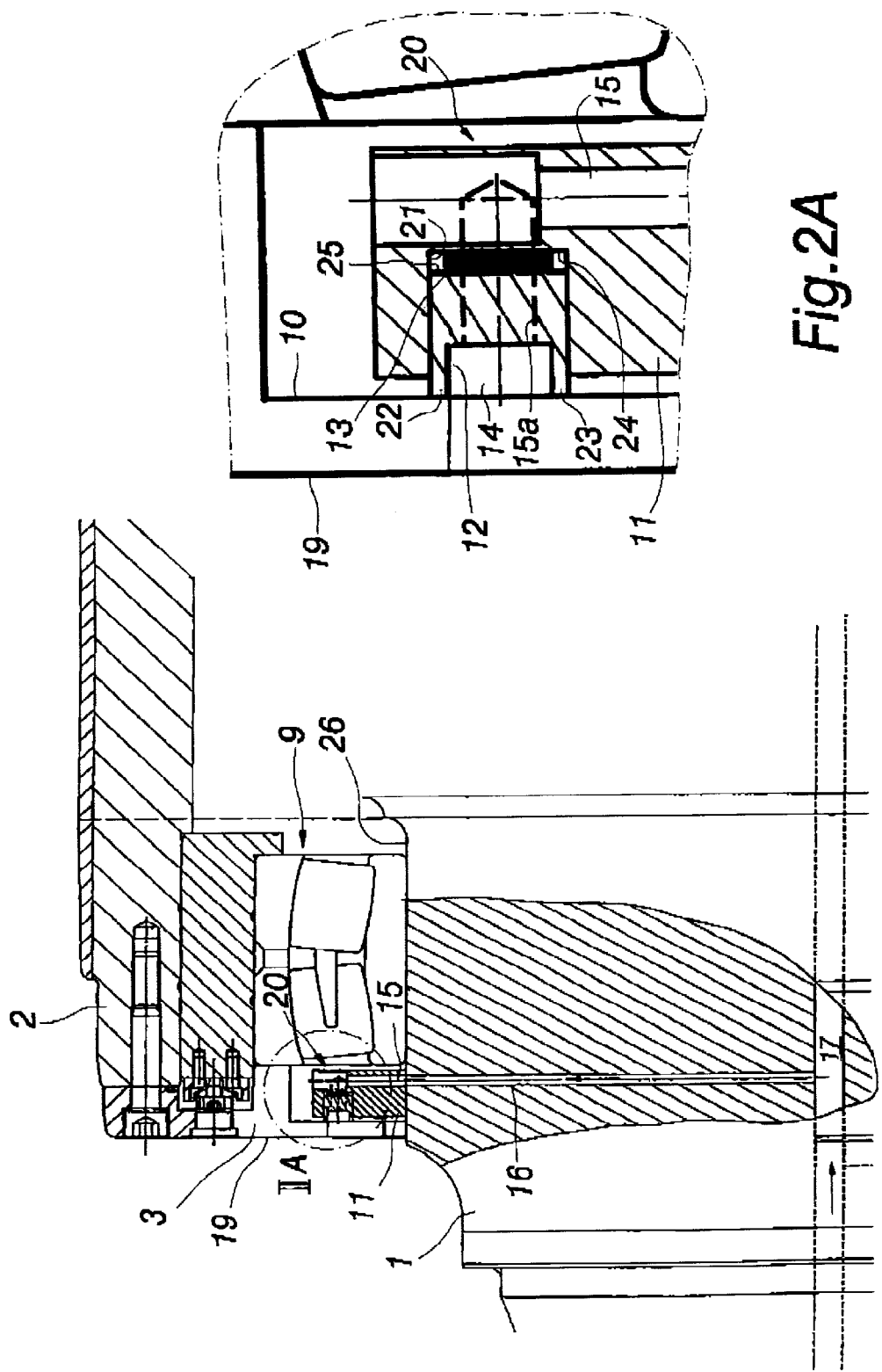
FIG. 2 is a schematic side elevation, showing one embodiment for an end packing of the invention in conjunction with a roll shell provided with roller bearings.
Figure 3:
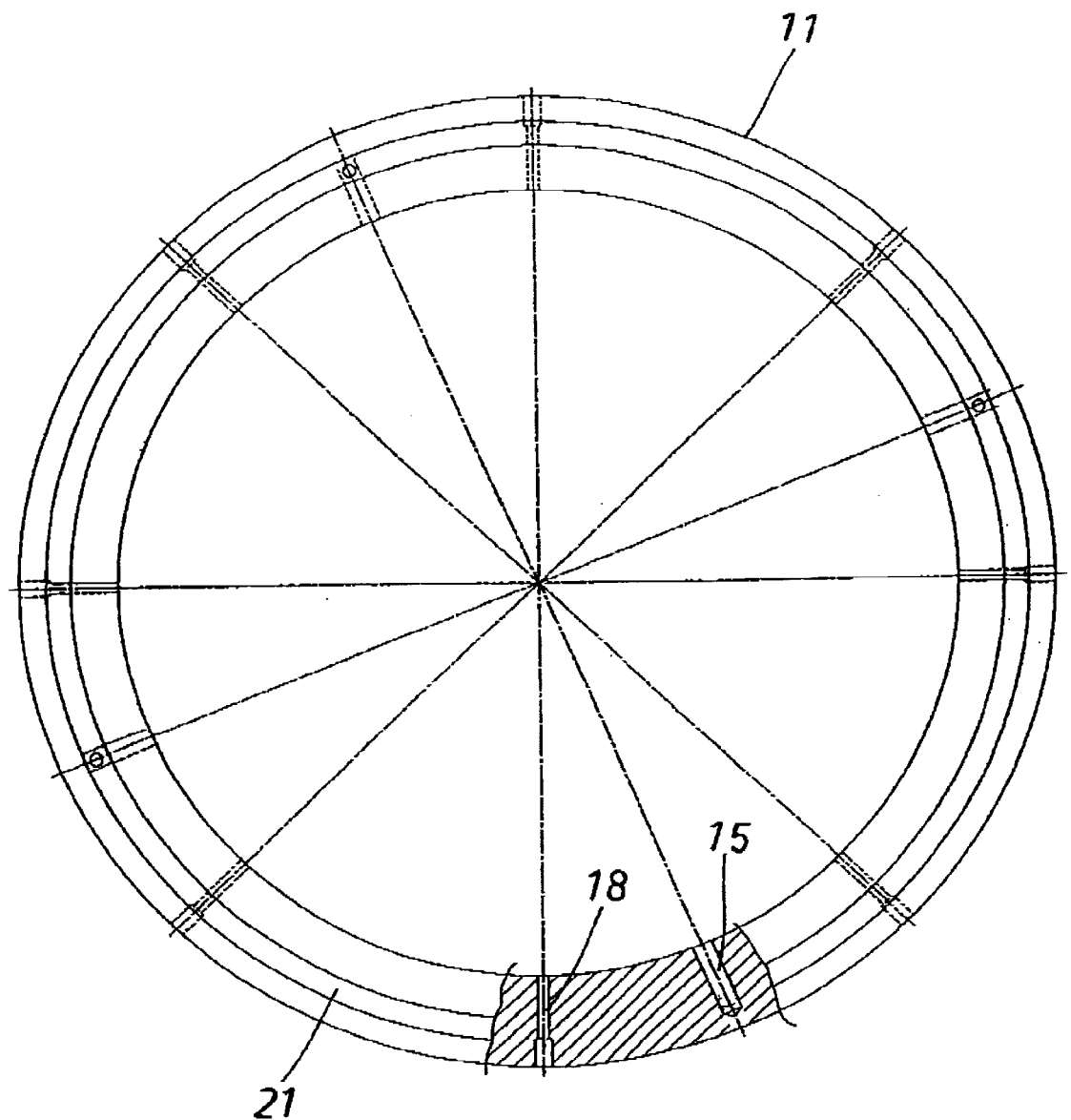
FIG. 3 is a schematic frontal view, showing an end packing component included in the embodiment of FIG. 2.

Referring to FIGS. 2 and 3, the deflection compensated roll comprises a stationary roll shaft 1, and a roll shell 2 bearing-mounted rotatably therearound with roller bearings 9 and provided with an end cap 3. Viewed in the axial direction of the roll, the end cap includes an external surface 19 and an internal surface, said internal surface being formed with a sealing surface 10. An end packing 20 of the invention comprises a labyrinth ring 11 mounted on the roll shaft 1 and formed with an annular groove 21 opening towards the sealing surface 10 of the end cap 3. The annular groove 21 of the labyrinth ring 11 is provided with a packing member 12, which has packing lips 22, 23 and an annular cavity 14 therebetween. The packing member 12 has its packing lips compressed by means of spring loading elements 13 in a sealing fashion against the sealing surface 10. The labyrinth ring 11 is mounted on the shaft 1 for example by means of fastening elements, such as bolts, extending through bores 18. The labyrinth ring is preferably mounted on the same outer diameter section 26 of the shaft 2 as the bearing elements 9. The labyrinth ring 11 is further formed with a bore 15 extending in a substantially radial direction of the roll, and with a bore 15a perpendicular thereto and extending in a substantially axial direction of the roll, said bore 15a continuing further as a bore extending through the spring loading elements 13 and the packing member 12 to the cavity 14. The bore 15 is set in alignment with a bore 16 formed in the roll shaft 1 and extending to a substantially axially directed air duct 17 normally pre-existing in the roll shaft, whereby the compressed air supplied into the air duct 17 can be delivered through the bore 16, 15 and 15a into the cavity 14. The compressed air to be supplied into the cavity 14 has its pressure selected to exceed the pressure of oil striving to seep through the packing and thus to ensure tightness of the packing member 12 against oil leaks in a relatively simple and reliable manner.

In the above embodiment, the end packing 20 is described in connection with a roller-bearing mounted roll shell, but it is also adaptable for use in connection with slide-bearing mounted roll shell, as will be described later with reference to FIG. 4, and also in such a case that the roll shell 2 is designed with a stroke, i.e. to be displaceable in a radial direction with respect to the roll shaft 1.

Figure 4:
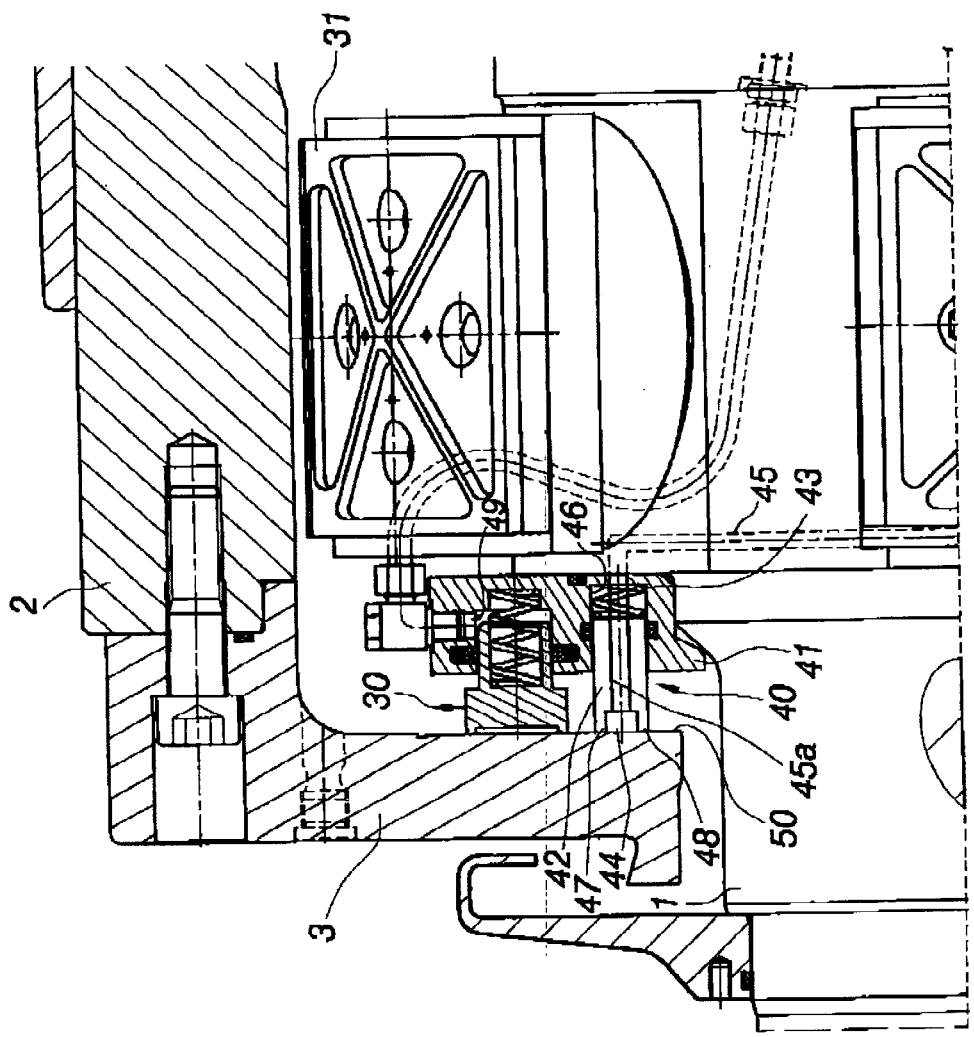
FIG. 4 is a schematic side elevation, showing a second embodiment for an end packing of the invention in conjunction with a roll shell provided with slide bearings.

FIG. 4 depicts an end packing 40 in connection with a slide-bearing mounted roll shell. The radially extending slide bearing elements are shown at reference numeral 31 and the axially extending slide bearing elements at reference numeral 30. These are conventional in the art and, hence, not described in more detail in this context. The end packing 40 comprises a labyrinth ring 41, which is provided with an annular groove 46 opening towards a sealing surface 50 of the end cap 3. The annular groove 46 is provided with a packing member 42, which has packing lips 47, 48 and an annular cavity 44 therebetween, which can be supplied with compressed air through a bore 45 existing in the roll shaft and a bore 45a present in the packing member 42 and in the labyrinth ring 4. Reference numeral 43 designates a spring element acting on the packing member 42. The end packing 40 is functionally consistent with the end packing 20 shown in FIGS. 2 and 3. The main structural difference is that the labyrinth ring 41 is mounted on another part of the shaft 1, and in the illustrated embodiment the labyrinth ring 41 further includes a bore 49 for axial bearing elements 30.

Figure 5:
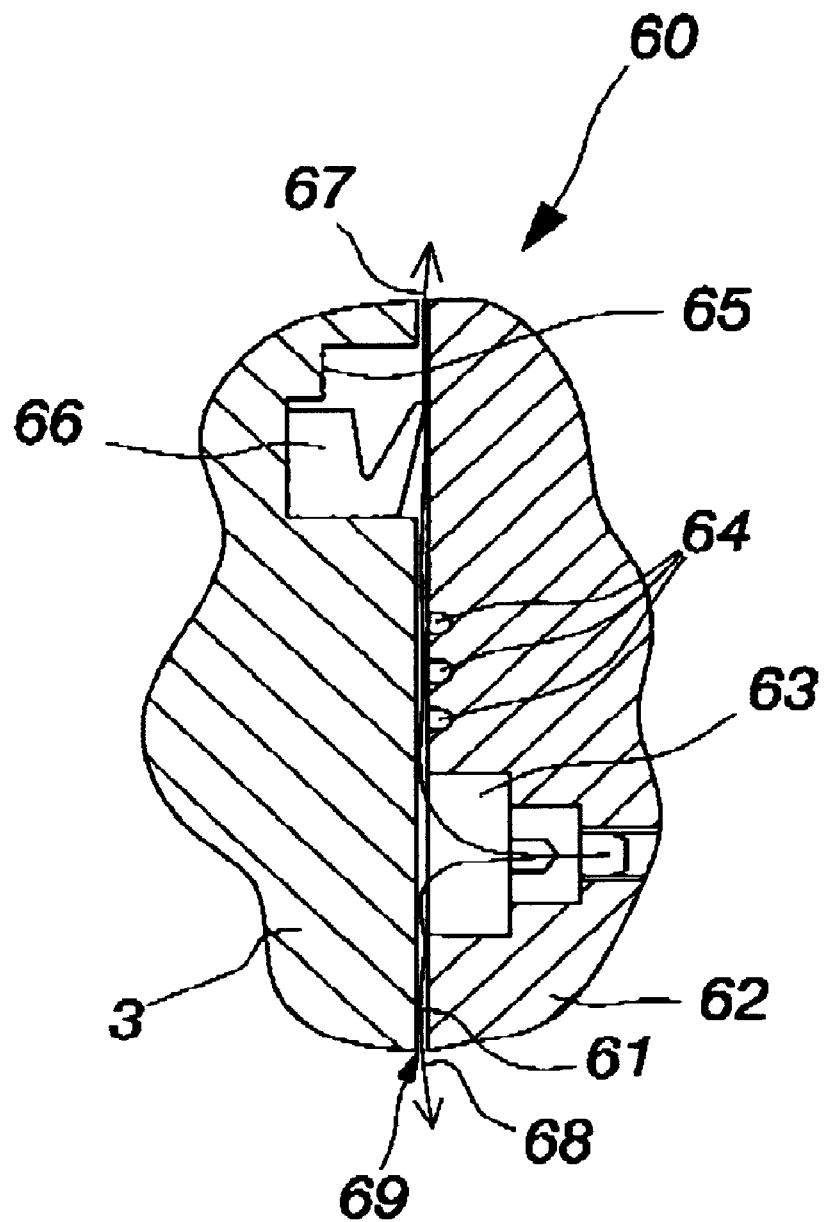
FIGS. 5–7 show still a few embodiments for an end packing of the invention in schematic elevations.

FIG. 5 depicts an embodiment, wherein the axial bearing elements are provided with a packing ring 62 which follows a sealing surface 61 of the end cap 3 very closely. The ring is made from a material which conforms as well as possible to resulting deformations and withstands a momentary contact with a rotating end cap. The material can be e.g. bronze for bearings.

The embodiment of FIG. 5 can be implemented e.g. in association with a slide bearing assembly of FIG. 4, the end packing elements 40 of FIG. 4 being replaced by the packing ring 62 of FIG. 5, which is mounted on the bearing shoe/shoes of the axial bearing 30 functionally in such a way that the packing ring 62 is separated from the sealing surface 61 of the end cap 3 by a gap that constitutes a narrow slot 69, thus traveling along with the bearing shoe/shoes in the axial direction of the roll. The slot 69 is supplied with compressed air through a cavity 63 formed in the packing ring and opening towards the sealing surface 61 of the end cap, said cavity being connected to a supply of compressed air (not shown). The slot 69 allows a flow of compressed air into the roll (an arrow 67) and out of the roll (an arrow 68). The air going into the roll displaces the oil striving to get out of the roll. As the roll is rotating, a centrifugal force also strives to hold the oil inside the roll. In addition, the compressed air flowing into the roll is used to maintain an excess pressure necessary for intensified oil removal. As for the mutually opposite faces of the end cap sealing surface 61 and the packing ring 62, one of said faces is preferably formed with pressure equalizing grooves 64 for ensuring a consistent air flow from the entire periphery. The grooves are circumferential and are located in positions outward from the cavity 63 as seen in radial direction. In addition, the compressed air flowing outwards from the roll (the arrow 68) strives to keep dirt particles outside, which would otherwise tend to penetrate into the roll.

The end cap has preferably its sealing surface 61 further provided with a circumferential sealing groove 65, which is fitted with a lip seal 66. The lip of the seal 66 disengages as a result of centrifugal force from its complementary surface as the roll is rotating at a speed required for a high web speed. The axial lip seal provides yet another throttle point for compressed air and it functions also as a safety element whenever the supply of compressed air disappears for some reason.

Figure 6:
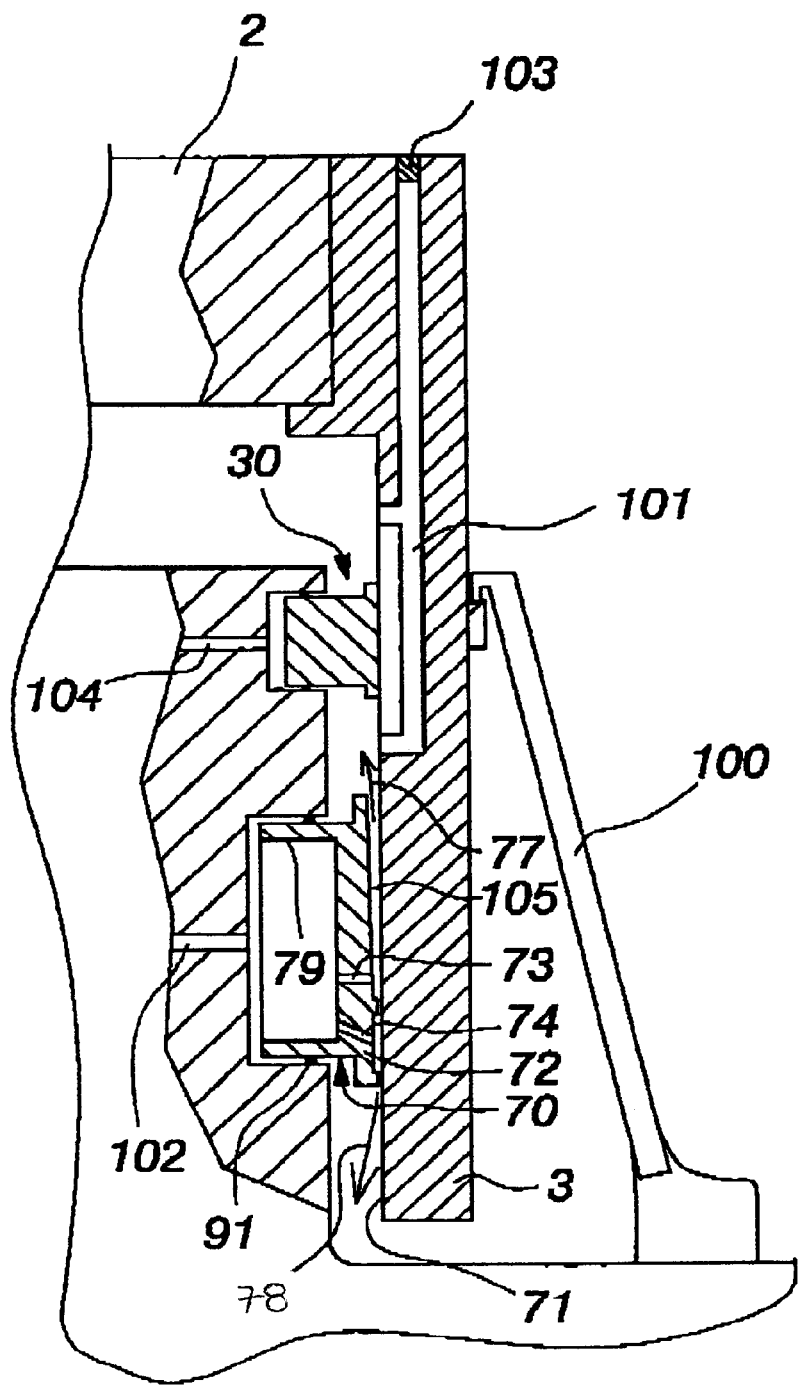

FIG. 6 depicts still another embodiment of the invention in connection with a slide-bearing mounted roll. Mounting with slide bearings is prior known for a person skilled in the art and, with regard to a slide bearing assembly, FIG. 6 only illustrates an axially directed slide bearing element 30, which is supplied with a necessary oil pressure along a channel 104. The end cap 3 of the shell 2 has its internal surface formed with a sealing surface 71 and the shaft 1 is provided with a bore, in which an end packing 70 is accommodated. The end packing 70 comprises a packing member 72, which is formed with a cavity 79 opening in a direction opposite to the sealing surface 71 and connected to a supply of compressed air (not shown) by way of a channel 102. The packing member 72 is formed with bores 73 and 74 for delivering compressed air from the cavity 79 into a slot 105 formed between the sealing-surface 71 facing front of the packing member 72 and the sealing surface 71. The packing member 72 has its front face preferably designed in such a way that the slot 105 is divergent in a direction extending from the bore 73 towards the interior of the roll (an arrow 78). The slot 105 is preferably about 0.02 mm at the bore 73 and diverges uniformly to a value of about 0.2 mm at its edge leading into the roll. These values are just directive in nature. In the illustrated embodiment, the bore 74 opens into a cavity, this in turn opens towards the sealing surface and enhances a uniform distribution of compressed air in circumferential direction. An arrow 77 is used to indicate the direction of compressed air flowing outwards from the roll. At reference numeral 100 there is shown a chute element mounted on the shaft 1, which functions as a safety element for collecting the oil possibly seeping through the packing.

Figure 7:
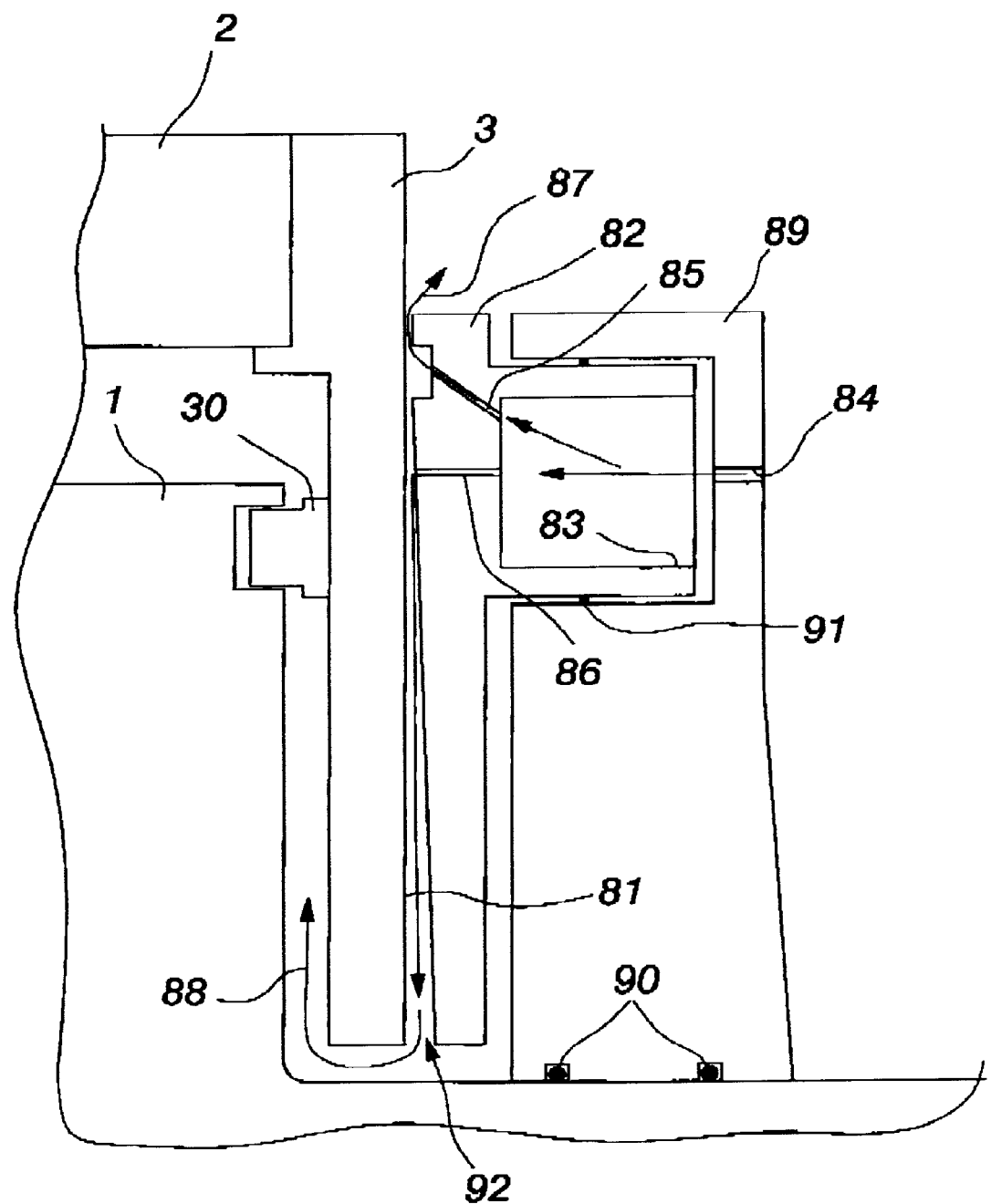

FIG. 7 shows yet another embodiment of the invention, which is different from that of FIG. 6 in that the end cap has a sealing surface 81 in its axially directed external surface. A packing member 82 is accommodated in a bore, which is formed in a packing body 89 mounted on the shaft 1 and which is connected to a supply of compressed air by way of a channel 84. A cavity 83 is connected by way of bores 85 and 86 to a slot 92 between the packing member 82 and the sealing surface 81. Reference numeral 91 designate seals.

In the embodiments of FIGS. 5–7, the material of a packing ring is preferably bronze.

We claim:

1. An end packing (20, 40, 60, 70, 80) for a deflection compensated roll, comprising a stationary shaft (1) and a roll shell (2), bearing-mounted rotatably therearound and having each end thereof provided with a shaft-enclosing annular end cap (3), having its surface internal in the axial direction of the roll or its surface external in the axial direction formed with a sealing surface (10, 50, 61, 71, 81), and shaft-mounted bearing elements (9, 30, 31) in each axial end zone of the roll shell (2) inside the end cap (3), wherein said end packing (20, 40, 60, 70, 80) comprises:

an annular packing member (12; 42; 62; 72; 82) extending around the shaft (2) and comprising a front face, which is directed towards said sealing surface (10, 50, 61, 71, 81), said packing member (12; 42; 62; 72; 82) being provided with elements connected to a supply of compressed air for delivering compressed air into a cavity (14, 44, 69, 92, 105) between the packing member and the sealing surface, whereby the compressed air striving to flow between the packing member's front face and the sealing surface into and out of the roll functions as a seal.

2. An end packing (20; 40) for a deflection compensated roll, comprising a stationary shaft (1) and a roll shell (2) bearing-mounted rotatably therearound and having each end thereof provided with a shaft-enclosing annular end cap (3), having an internal surface in the axial direction of the roll formed with a sealing surface (10; 50), and shaft-mounted bearing elements (9; 30, 31) in each axial end zone of the roll shell (2) inside the end cap (3), the roll end packing elements (20; 40) being mounted on the shaft (2) inside the end cap (3) for a sealing contact against the sealing surface (10; 50) of the end cap, said end packing (20; 40) comprising:

a labyrinth ring (11; 41) mounted on the shaft (2) and including a packing member (12; 42) which is compressible against the sealing surface (10; 50) and provided with packing lips (22, 23; 47, 48) setting against the sealing surface (10; 50) and having therebetween a cavity (14; 44) opening towards the sealing surface (10; 50), and that the labyrinth ring (11; 41) is provided with a bore (15, 15a; 45a) for delivering compressed air from a compressed air duct (16, 17; 45) existing in the shaft (2) into the cavity (14; 44) of the packing member (12; 42).

3. The end packing (20; 40) as set forth in claim 2, wherein the packing member (12; 42) is accommodated in an annular groove (21; 46) formed in the labyrinth ring (11; 41), the space between a bottom (24) of said groove and a bottom surface (25) of the packing member (12; 42), directed towards the same, being provided with spring loading elements (13; 43) for pressing the packing member (12; 42) against the sealing surface (10; 50).

4. The end packing (20; 40) as set forth in claim 3, wherein the labyrinth ring (11; 41) has its bore (15a; 45a) continuing as a bore extending through the spring loading elements (13; 43) and the packing member (12; 42).

5. An end packing (60) for a deflection compensated roll, comprising a stationary shaft and a roll shell bearing-mounted rotatably therearound and having each end thereof provided with a shaft-enclosing annular end cap (3), having its surface which is internal in the axial direction of the roll formed with a sealing surface (61), and shaft-mounted slide bearing elements (30, 31) in each axial end zone of the roll shell inside the end cap (3), said slide bearing elements comprising radial slide bearing elements (31) and axial slide bearing elements (30), said end packing (60) comprising:

a packing ring (62), coupled functionally with the bearing shoes of the axial slide bearing elements and located, as seen in the radial direction, inside said bearing shoes, said packing ring being provided with a cavity (63) opening towards the sealing surface (61) of the end cap and connected to a supply of compressed air, said packing ring (62) being separated from the sealing surface of the end cap by an axial gap constituting a narrow slot (69), said slot (69) allowing a flow of compressed air into the roll (an arrow 67) and out of the roll (an arrow 68).

6. The end packing as set forth in claim 5, wherein the packing ring (62) has a front and the end cap sealing surface (61) has a front face opposite the front face of said packing ring (62), one of said front faces being formed with pressure equalizing grooves (64).

7. The end packing as set forth in claim 5, wherein the end cap has its sealing surface (61) further provided with a sealing groove (65), which is fitted with a lip seal (66) subjected to an axially directed loading towards the packing ring (62).

* * * * *

UNITED STATES PATENT AND TRADEMARK OFFICE
CERTIFICATE OF CORRECTION

PATENT NO. : 6,692,421 B1
DATED : February 17, 2004
INVENTOR(S) : Antti Tavi et al.

It is certified that error appears in the above-identified patent and that said Letters Patent is hereby corrected as shown below:

<u>Title page,</u>
Item [30], Foreign Application Priority Data, "Jan. 29, 2001 (FI).......010043 U" should read -- Jan. 29, 2001 (FI) ........ US20010043 --.

Signed and Sealed this

Eleventh Day of May, 2004

JON W. DUDAS
*Acting Director of the United States Patent and Trademark Office*